United States Patent [19]

Lemaire et al.

[11] Patent Number: 5,730,265
[45] Date of Patent: Mar. 24, 1998

[54] DEVICE FOR SUSPENDING AN ELECTRICAL CONDUCTOR FROM A CARRYING CABLE

[75] Inventors: Eric Lemaire, Amilly; Guy Neige, Dijon; Jean-Claude Thiard, Chenove; Philippe De Faucamberge, Boulogne, all of France

[73] Assignee: The Whitaker Corporation, Wilmington, Del.

[21] Appl. No.: 765,250

[22] PCT Filed: Jul. 6, 1995

[86] PCT No.: PCT/FR95/00906

§ 371 Date: Dec. 19, 1996

§ 102(e) Date: Dec. 19, 1996

[87] PCT Pub. No.: WO96/01747

PCT Pub. Date: Jan. 25, 1996

[30] Foreign Application Priority Data

Jul. 7, 1994 [FR] France ............................ 94 08422

[51] Int. Cl.⁶ ........................................... B60M 1/20
[52] U.S. Cl. ........................................... 191/40
[58] Field of Search ........................ 191/40, 41, 42, 191/43, 44; 104/115; 248/61

[56] References Cited

U.S. PATENT DOCUMENTS

| 2,304,763 | 12/1942 | Matthes ............... | 191/40 |
| 5,421,068 | 6/1995 | Menechella ............ | 191/40 |

FOREIGN PATENT DOCUMENTS

| 45204 | 12/1930 | Denmark ............... | 191/40 |
| 682 102 A | 5/1930 | France . | |
| 656602 | 10/1936 | Germany .............. | 191/40 |
| 30 36 045 A1 | 5/1982 | Germany . | |
| 35 22 543 A1 | 1/1987 | Germany . | |

*Primary Examiner*—S. Joseph Morano

[57] ABSTRACT

A connecting dropper provides a mechanical articulated and electrical linkage between a carrying cable and a conductor, particularly a contact wire of an overhead electrical traction line. The dropper wire provides a continuous electrical connection between the carrying cable and the contact wire. The dropper wire (14) is connected to respective connecting clips (18,18') providing the connection to the carrying cable (10) and the contact wire (12) via sleeves (20,20';32,32') in which the ends of the dropper wire are pinched, and the connecting clips (18,18') consist of two detachable parts that are snapped together to grip the carrying cable (10) and the contact wire (12) respectively.

3 Claims, 3 Drawing Sheets

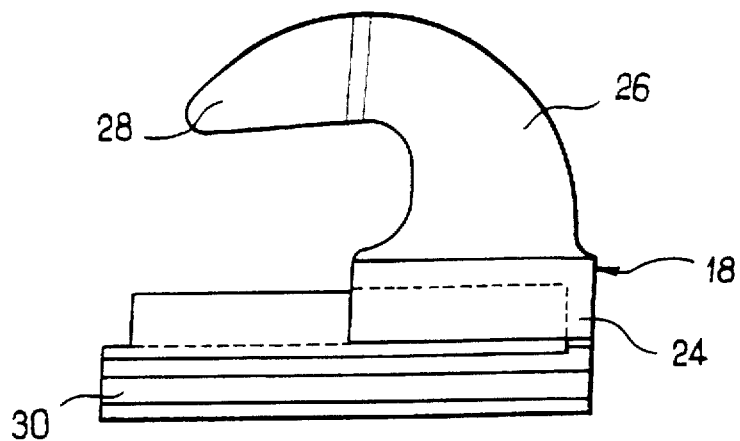
FIG_4
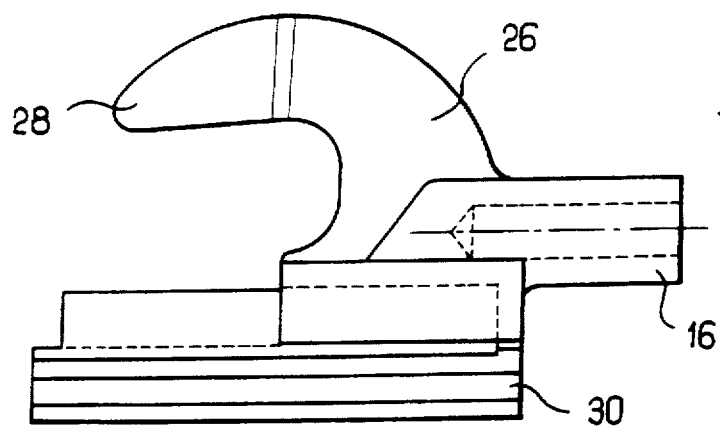
FIG_5
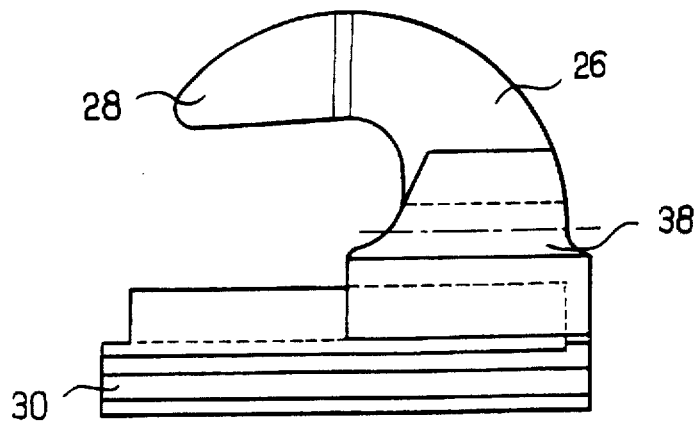
FIG_6

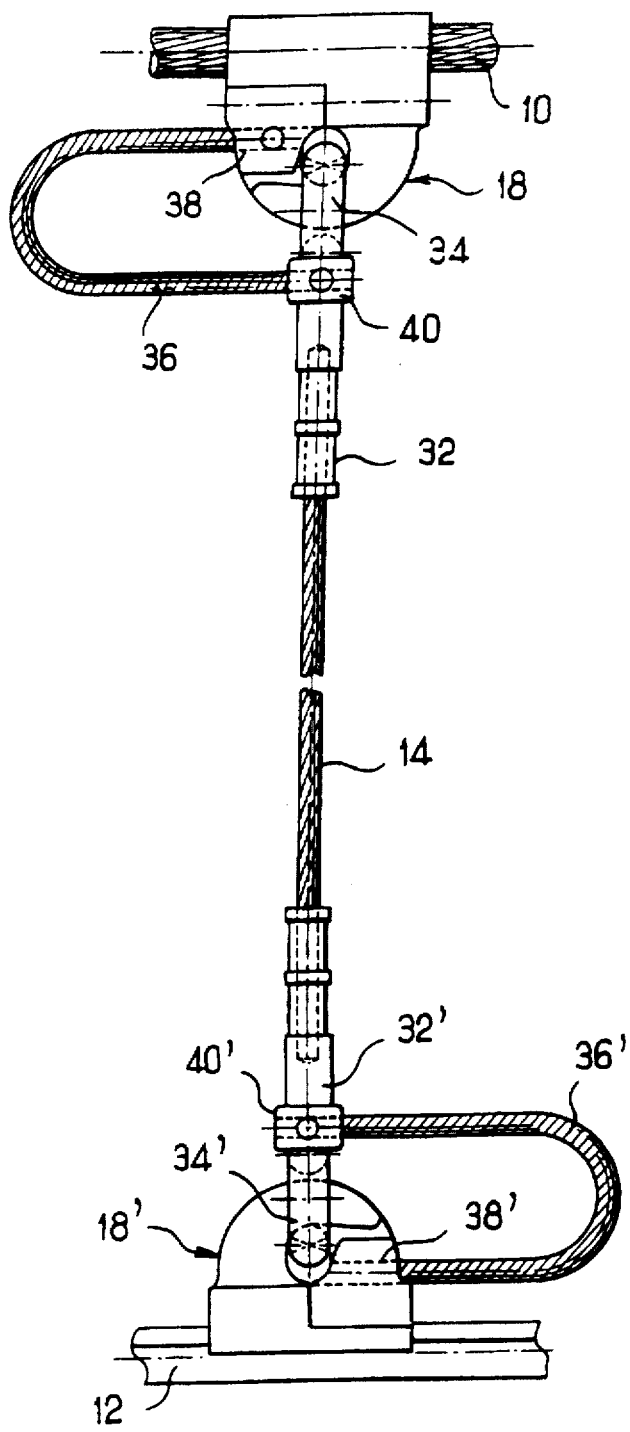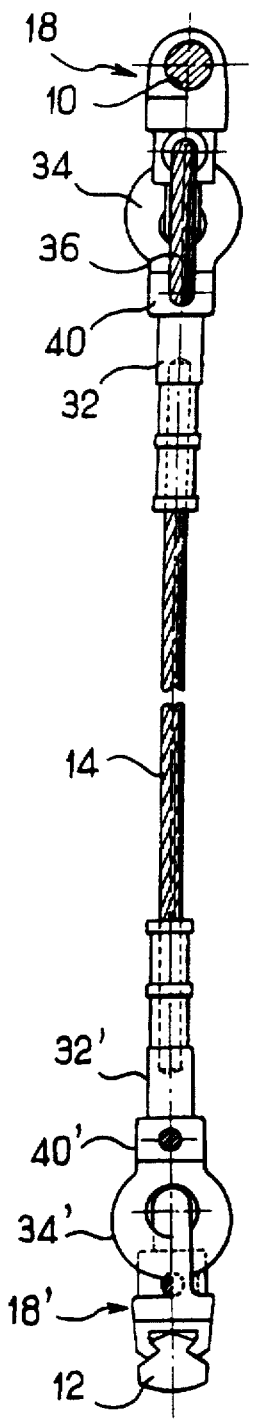

DEVICE FOR SUSPENDING AN ELECTRICAL CONDUCTOR FROM A CARRYING CABLE

BACKGROUND OF THE INVENTION

1. Field of the Invention

The present invention relates to a device for hanging an electric conductor from a carrying cable. The invention refers more specifically to such a device which is known as a dropper making it possible to produce an articulated mechanical and electrical link between a conductor such as especially the contact wire of an overhead line for electric traction and its carrying cable. It is known that in such a system the dropper supports the contact wire and also provides the electrical continuity between the carrying cable and this contact wire.

2. Summary of the Prior Art

Droppers allowing such a mechanical and electrical link to be achieved are already known, but these known droppers are not entirely satisfactory especially as regards the methods of securing the dropper cable to the clamping systems employed to hold the dropper between the carrying cable and the contact wire. These known systems especially have the drawback of leading to the formation of electric arcs at the various linking members.

SUMMARY OF THE INVENTION

The present invention proposes to provide a dropper which makes it possible to avoid the formation of electric arcs and to dispense with the electric distribution assemblies, the dropper simultaneously fulfilling an articulated mechanical function of supporting the contact wire, and an electrical-supply function.

As a consequence, the invention provides a dropper providing the articulated mechanical and electrical link between a carrying cable and a conductor, more particularly the contact wire of an overhead line for electric traction, in which dropper the dropper cable provides the electrical continuity between the carrying cable and the contact wire, this dropper being characterized in that the connection between its cable and the clamps for connection respectively to the carrying cable and to the contact wire is achieved by means of terminators in which the ends of the dropper cable are crimped, and in that the said connection clamps are produced in two removable parts which snap-fasten together to clamp the carrying cable and the contact wire respectively.

According to a first embodiment of the present invention, the dropper cable is continuous: it directly connects the connection clamps to which its respective ends are crimped, intermediate eye stiffeners, also crimped to the dropper cable at points chosen as a function of the length of the dropper coming into engagement in said connection clamps in order to form with the dropper cable loops of adjustable lengths which additionally allow the length of the dropper to be adapted to preestablished drop values.

According to a second embodiment of the present invention, the dropper cable is discontinuous: its two ends are respectively crimped on terminators secured to eye stiffeners which engage in the connection clamps, and conductors, the ends of which are respectively crimped on the said clamps and on the said eye stiffeners providing the electrical link via the dropper cable, between the carrying cable and the contact wire.

According to a preferred embodiment, each of the connection clamps consists of two similar elements which snap-fasten together, each of the said elements including a base and a hook element which is provided on its internal face with a profiled plane surface which upon snap-fastening interacts with the corresponding surface of the similar hook element provided on the second element of the clamp, so as to constitute an eye in which the eye stiffener crimped on the dropper cable becomes engaged, the respective lower parts of the two clamp elements delimiting a groove in which the contact wire or the carrying cable becomes engaged when the two elements are snap-fastened, thus clamping the contact wire or the carrying cable in the corresponding clamp, without having to resort to an independent mounting means, especially clamping using nuts and bolts.

Further features and advantages of the present invention will emerge from the description given hereafter with reference to the appended drawings which illustrate various embodiments thereof, without having any restrictive nature.

BRIEF DESCRIPTION OF THE DRAWINGS

FIGS. 4, 5 and 6 are respectively front elevations of embodiments of one of the elements constituting a connection clamp for the dropper according to the present invention, these various figures being on larger scales by comparison with the preceding figures;

FIG. 7 is a front elevation of a second embodiment (discontinuous embodiment) of the dropper according to the present invention; and FIG. 8; is a side elevation of FIG. 7.

DETAILED DESCRIPTION OF THE PREFERRED EMBODIMENT

As has already been specified, the dropper according to the present invention is designed and produced in such a way as to dispense with the electrical distribution assemblies by fulfilling both the mechanical function and the electrical-supply function. In such a dropper, the links between the various elements are achieved without having to resort to independent mounting, especially clamping using nuts and bolts.

As was mentioned in the preamble of the present description, the invention anticipates two main embodiments: the so-called continuous solution in which the dropper cable alone fulfils the two functions mentioned hereinabove, and the discontinuous solution in which two other conducting cables are associated with the dropper cable in order to fulfil the two abovementioned functions.

Figure 2:
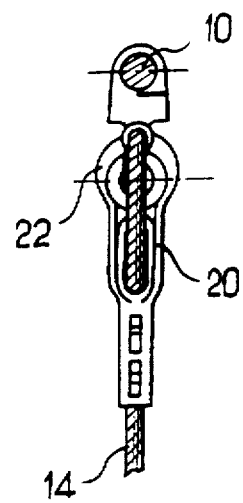
FIG. 2 is a partial side elevation representing the link between the dropper cable according to FIG. 1 and the carrying cable.
Figure 3:
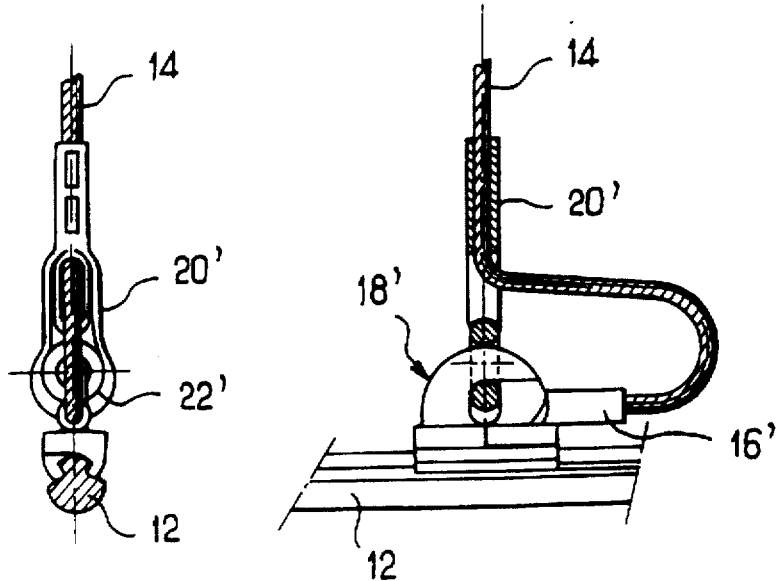
FIG. 3 is a view similar to FIG. 2 representing the link between the dropper cable according to FIG. 1 and the contact wire.

The first embodiment will be described with reference to FIGS. 1 to 3.

In these figures, the reference 10 denotes the carrying cable of an overhead line for electric traction to which the invention preferably applies, and the reference 12 denotes the contact wire of this line. In this first solution, the dropper cable 14 provides the mechanical support for the contact wire 12 with respect to the carrying cable 10 and the electrical continuity between these two conductors.

18 and 18' represent the clamps for connecting the dropper to the carrying cable 10 and to the contact wire 12 respectively. These connection clamps will be described in greater detail below with reference to FIGS. 4 and 5.

Figure 1:
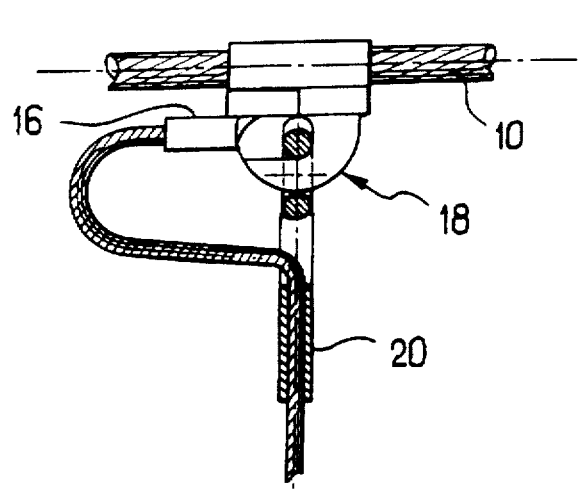
FIG. 1 is a front elevation of a first embodiment (continuous embodiment) of a dropper according to the present invention.

Each of the ends of the dropper cable 14 is held by crimping in a terminator 16,16' integral with each connecting clamp 18,18' as clearly visible in FIG. 1.

In order to be able to set (at the workshop) the distance between the carrying cable 10 and the contact wire 12 as desired depending on the pre-established drop values, the dropper cable 14 has loops, the length of which may be adjustable at each of its ends, as clearly visible in FIG. 1. These loops are obtained by providing eye stiffeners 20, 20', the ends of which are respectively crimped at given points along the cable 14 which depend on the desired length of dropper, the other ends of these eye stiffeners being in the form of eyes 22,22' which are engaged in the connection clamps 18,18' in the way described hereafter with reference to FIGS. 4 and 5.

It will be observed that this first embodiment indeed fulfils the dual function mentioned hereinabove, using a dropper cable, the links being achieved without calling upon independent mounting, especially such as clamping using nuts and bolts.

Reference is now made to FIGS. 4 and 5 which represent in detail the elements of one embodiment of a connection clamp 18,18' which achieves the link between the dropper cable 14 on the one hand, and the carrying cable 10, as far as the connection clamp 18 is concerned, and the contact wire 12, as far as the connection clamp 18' is concerned.

As was mentioned in the foregoing description, each connection clamp comprises two similar elements designed to snap-fasten together as visible in FIG. 1. Each connection clamp element 18,18' therefore includes a base 24 and a hook element 26 provided on its internal face with a profiled plane surface 28 intended to interact with the corresponding surface of the similar hook element which is provided on the second element of the connection clamp 18,18' so as to form an eye in which the eye 22 or 22' of the eye stiffeners 20 or 20' described above can engage, as clearly visible in FIGS. 2 or 3. The snap-fastening of the two connection clamp elements 18,18' takes place when clamping onto the corresponding cable, the carrying cable 10 or contact wire 12, the latter engaging in the housing delimited by the groove 30 in each of the connection clamp elements.

Reference is now made to FIGS. 7 and 8 which illustrate the second embodiment of the invention (discontinuous embodiment).

The dropper cable 14 has ends which are crimped to terminators 32,32' respectively, these terminators being integral with an eye stiffener 34,34' respectively having an eye which engages in the connection clamps 18,18'. In order to provide electrical continuity between the carrying cable 10 and the contact wire 12, conducting cables such as 36,36' are provided, the respective ends of these being rendered integral with the eye stiffener 34,34' respectively and with the connection clamp 18,18' respectively.

One of the ends of each conducting cable 36,36' is crimped into a housing 38,38' integral with the connection clamp 18,18' and its other end is held by crimping in a housing 40,40' integral respectively with an eye stiffener 34,34' respectively.

In this embodiment, the connection clamps 18,18' have the same construction as the one described hereinabove with reference to FIGS. 4 and 6. The choice of length of dropper cable 14 makes it possible to alter the distance between the carrying cable 10 and the contact wire 12.

Like the first embodiment described hereinabove with reference to FIGS. 1 to 3, this second embodiment fulfils both the mechanical function of supporting the contact line and the electrical-supply function, the links between the various elements of the dropper being obtained without calling upon an independent mounting such as especially clamping using nuts and bolts.

The first embodiment (continuous solution) allows droppers to be made up in the workshop at mass-production costs from pre-established drop values, the lengths of the dropper cables 14 being set in the factory, while the second embodiment is further adapted for being put together on site for customized applications.

It remains clearly understood that the present invention is not limited to the embodiments described and/or represented hereinabove, but that it encompasses all alternative forms thereof.

I claim:

1. A dropper providing for an articulated mechanical and electrical link between a carrying cable and a contact wire of an overhead line for electric traction, said dropper comprising a dropper cable which provides electrical continuity between the carrying cable and the contact wire, the dropper cable being connected to clamps for connection respectively to the carrying cable and to the contact wire by means of terminators in which the ends of the dropper cable are crimped, wherein the said clamps are made of two removable parts which can be snap-fastened together to clamp the carrying cable and the contact wire respectively and wherein the dropper cable is discontinuous and includes a dropper cable portion with ends that are respectively crimped to said terminators secured to eye stiffener engaged in the connection clamps and conducting cables which are respectively crimped in housing integral with said clamps and on said eye stiffeners, thereby providing an electrical link via the dropper cable portion, between the carrying cable and the contact wire.

2. The dropper according to claim 1 wherein each of the two removable parts are similar elements which snap-fasten together, each of the said elements including a base and a hook element which is provided on an internal face having a profiled plane surface which, upon snap-fastening, interacts with the corresponding surface of the similar hook element provided on a second said element of the clamp, so as to constitute an eye in which the eye stiffener crimped on the dropper cable becomes engaged, respective lower parts of the two clamp elements delimiting a groove in which the contact wire or the carrying cable becomes engaged when the two elements are snap-fastened, thus clamping the contact wire or the carrying cable in the corresponding clamp.

3. A dropper providing for an articulated mechanical and electrical link between a carrying cable and a contact wire of an overhead line for electric traction, the dropper comprising a dropper cable which provides electrical continuity between the carrying cable and the contact wire, the dropper cable being connected to clamps for connection respectively to the carrying cable and to the contact wire by means of terminators in which ends of the dropper cable are crimped, wherein said clamps are made of two removable parts which can be snap-fastened together to clamp the carrying cable and the contact wire respectively and wherein each of the two removable parts are similar elements which snap-fasten together, each of the said elements including a base and a hook element which is provided on an internal face having a profiled plane surface which, upon snap-fastening, interacts with the corresponding surface of the similar hook element provided on a second said element of the clamp, so as to constitute an eye in which an eye stiffener crimped on the dropper cable becomes engaged, respective lower parts of the two clamp elements delimiting a groove in which the contact wire or the carrying cable becomes engaged when the two elements are snap-fastened, thus clamping the contact wire or the carrying cable in the corresponding clamp.

* * * * *